April 9, 1968 S. H. MAGNUSSON 3,376,806
FRYING APPARATUS
Filed Jan. 12, 1967 4 Sheets-Sheet 3
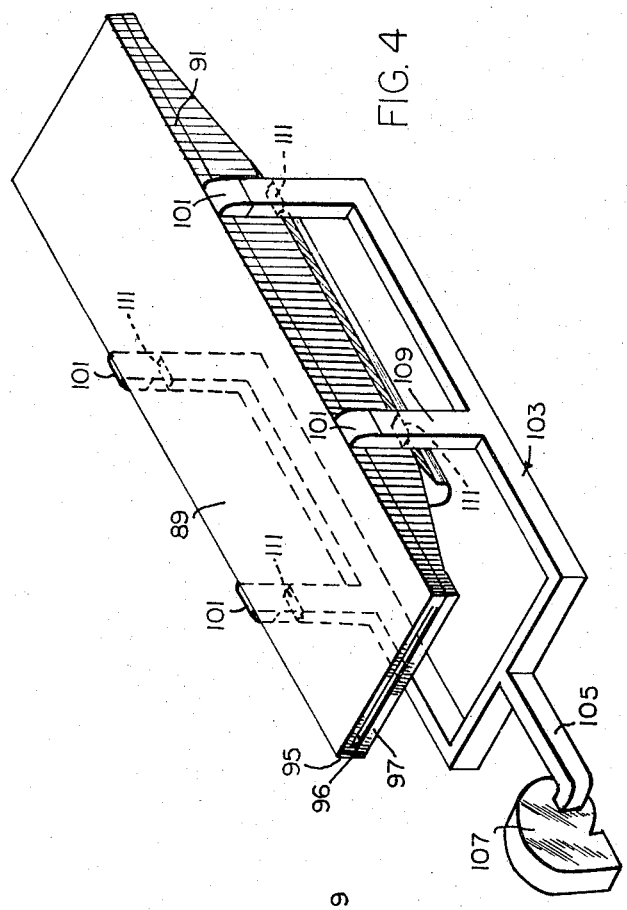
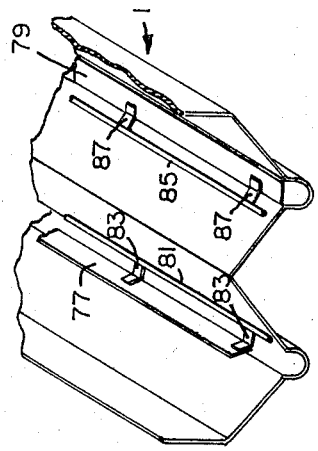
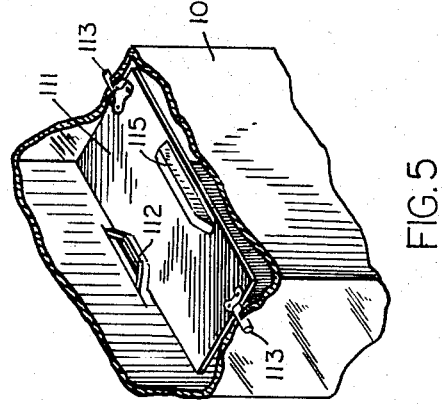
INVENTOR
SVERRIR H. MAGNUSSON
BY,
Kenway, Jenney & Hildreth
ATTORNEYS April 9, 1968 S. H. MAGNUSSON 3,376,806
FRYING APPARATUS Filed Jan. 12, 1967 4 Sheets-Sheet 4

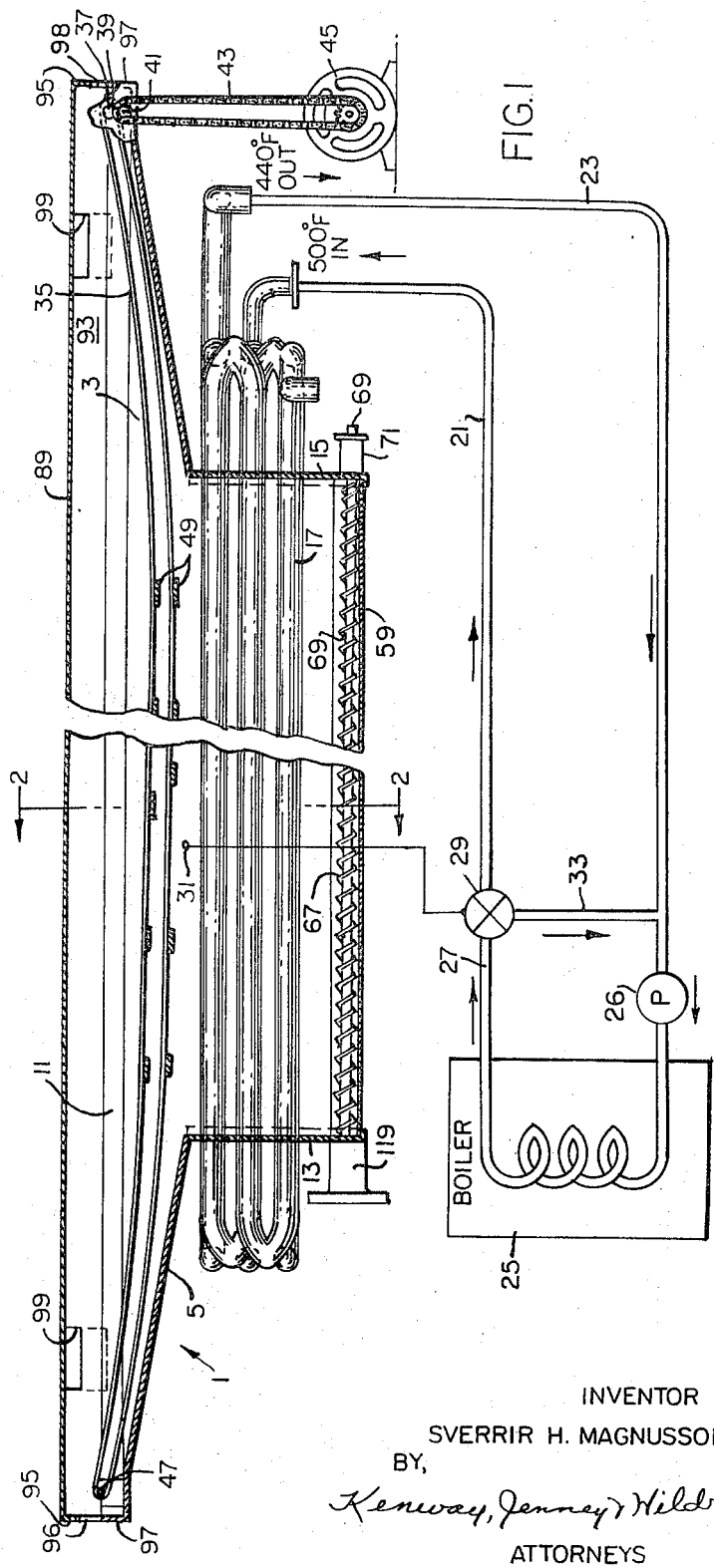

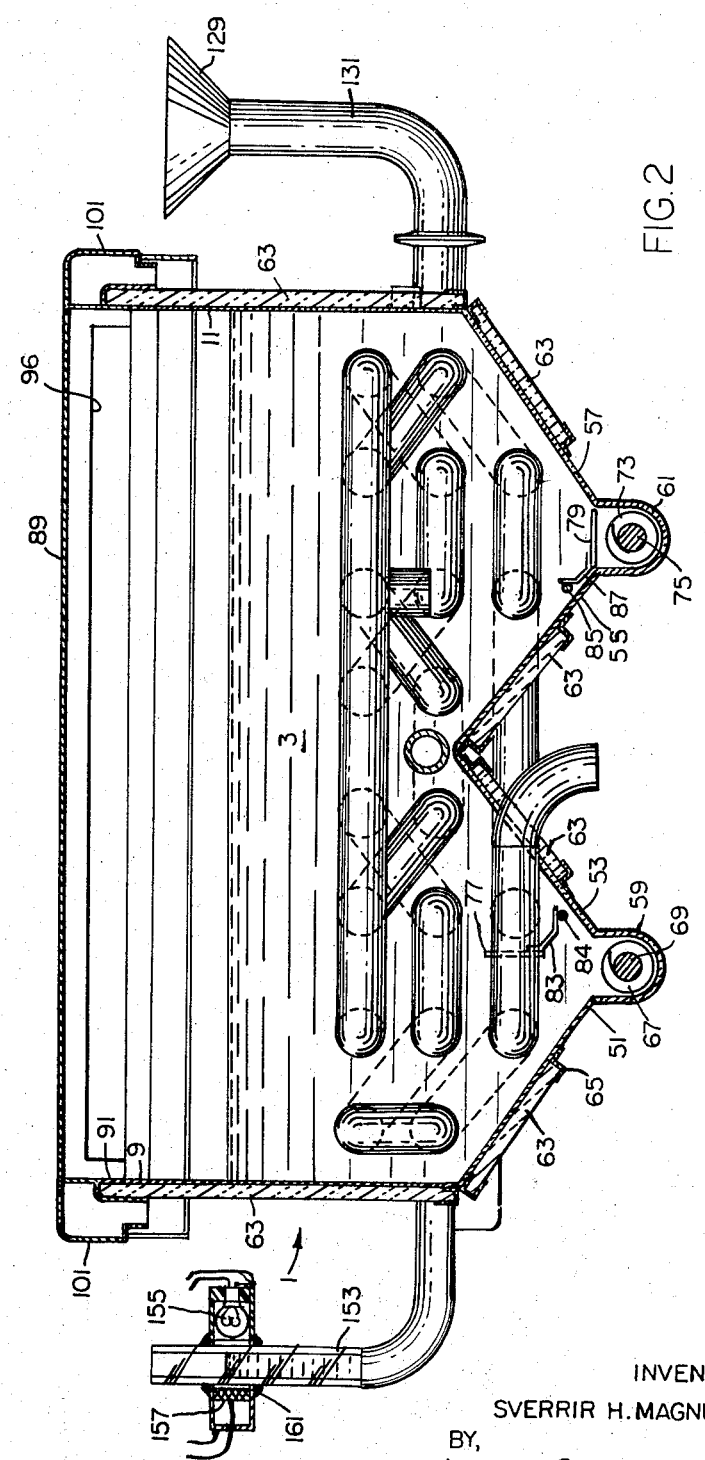

INVENETOR
SVERRIR H. MAGNUSSON
BY,
*Keneway, Jenney & Hildreth*
ATTORNEYS

United States Patent Office 3,376,806
Patented Apr. 9, 1968

3,376,806
FRYING APPARATUS
Sverrir H. Magnusson, Wormleysburg, Pa., assignor to Design & Process Engineering, Inc., Waltham, Mass., a corporation of Massachusetts
Filed Jan. 12, 1967, Ser. No. 608,773
8 Claims. (Cl. 99—408)

ABSTRACT OF THE DISCLOSURE

A continuous belt hot oil fryer comprising an indirectly heated cooking oil reservoir. A vapor trap is provided for excluding air from contact with the cooking oil. Two valved settling chambers in the cooking well are alternately opened to collect crumbs and closed to permit removal of crumbs to provide continuous oil cleaning. The full specification should be consulted for an understanding of the invention.

*Disclosure*

My invention relates to food cooking apparatus, and particularly to a novel fryer for continuous deep fat frying of food products such as shrimp, breaded fishsticks and the like.

There is an increasing demand for precooked prepared food, and particularly for fried products such as breaded fishsticks, shrimp, potatoes, potato chips and the like. Various forms of cooking apparatus for continually preparing fried foods of this kind have been developed. However, problems have been encountered in the use of such apparatus, which, so far as I am aware, have not been satisfactorily solved prior to my invention. Generally speaking, these problems are related to the necessity for keeping the cooking oil clean and fresh.

Conventional frying apparatus usually requires a relatively large charge of cooking oil in relation to the amount taken out by the cooked product. Typically, for example, a conventional fryer will require a charge of cooking oil weighing considerably more than the weight of product handled per hour, but the fried product will carry with it only about 10 percent of its own weight in cooking oil. If only the oil taken out by the product is replenished, the average time that oil spends in the cooking well of a conventional fryer may be quite long. Thus, deterioration of the cooking oil accelerated by heating may make it necessary to discard large amounts of oil simply because it is no longer fit for cooking use. And even though the oil is discarded when the product is apparently still of good quality, the storage life of the product is reduced. Even a product fried in fresh oil will acquire a rancid taste in time, and the longer the cooking oil stays in the cooking well of the fryer, the shorter that storage time becomes.

Another factor that hastens the deterioration of the cooking oil in a fryer is the crumbs, such as bread crumbs and the like, which drop from the product into the cooking oil. These crumbs gradually become charred, and break down into a very fine debris that is difficult to remove by filtration and soon renders the cooking oil unfit for use.

Further deterioration of the cooking oil may be caused by overheating. In many instances, cooking oil is heated by gas fired pipes extending through the cooking well, and the oil tends to crack and otherwise react chemically at the hot heating surfaces.

A primary object of my invention is to facilitate the continuous deep frying of foods to produce a high quality product. Other objects are to reduce the amount of cooking oil required in continuous frying, and to decrease the residence time of cooking oil in a continuous fryer.

Briefly, the above and other objects of my invention are attained by a fryer comprising a relatively shallow cooking well for containing a bath of cooking oil, a heat exchanger in the well, and means for supplying indirectly heated heating oil to the heat exchanger so that the cooking oil is heated gently and evenly. The cooking well of the apparatus of my invention is preferably provided with two settling sections at the bottom. Each settling section comprises a trough with downwardly inclined walls terminating at the bottom in a channel for the accumulation of crumbs and other debris which may drop from the cooked food. The oil in these channels is maintained at a lower temperature than the body of the oil in the cooker, whereby charring is reduced. A conveyor is placed in each of the crumb channels, and each channel is provided with a damper actuated at times to close the top of the channel and form with the channel a substantially closed conduit. Apparatus is provided for alternately closing one damper and operating the associated conveyor, while leaving the other damper open, and then closing the other damper and operating its conveyor while the first damper is open. The channels are connected through a three-way valve with a pump and a filter. By that arrangement, the crumbs in the cooking oil can be continuously collected and the dirty oil pumped through the filter to remove the crumbs. The filtered oil is recycled to the cooking well. Another important feature of my invention is the provision of a vapor trap over the cooking oil. This apparatus comprises a cover over the cooking well and an exhaust system for removing vapor from the plenum formed between the cover and the hot oil at a controlled rate. Moisture coming off of the cooking product during the cooking process is collected as steam in the space above the cooking oil, and is maintained at a slight positive pressure by the exhaust system. By that arrangement, the hot oil is in contact only with steam, and not with air that would cause surface oxidation of the oil. Makeup oil is continuously supplied by an automatic oil level control apparatus. Food is continuously supplied to the cooking well on a conveyor belt having a relatively close mesh that further aids in preventing crumbs from contaminating the oil. The construction of the well is such that only a relatively small charge of oil is needed, which is rapidly changed as the product takes oil out and new oil is added.

The construction of the apparatus of my invention, and its mode of operation, will best be understood in the light of the following detailed description, together with the accompanying drawings, of a preferred embodiment thereof.

In the drawings,

FIG. 1 is an elevational view, with parts shown in cross-section and parts broken away, of a continuous fryer in accordance with my invention;

FIG. 2 is a cross-sectional view taken substantially along the lines 2—2 in FIG. 1, except for heating coils shown in full as from the right in FIG. 1;

FIG. 3 is a perspective sketch showing the crumb collection and disposal apparatus forming a portion of the cooking chamber of the fryer of FIGS. 1 and 2;

FIG. 4 is a perspective sketch of the exterior of the apparatus of FIGS. 1 and 2, showing the construction of the vapor trap;

FIG. 5 is a fragmentary perspective sketch, with parts shown in cross-section and parts broken away, of a portion of the apparatus of FIG. 4, illustrating the operation of a damper;

Figure 6:
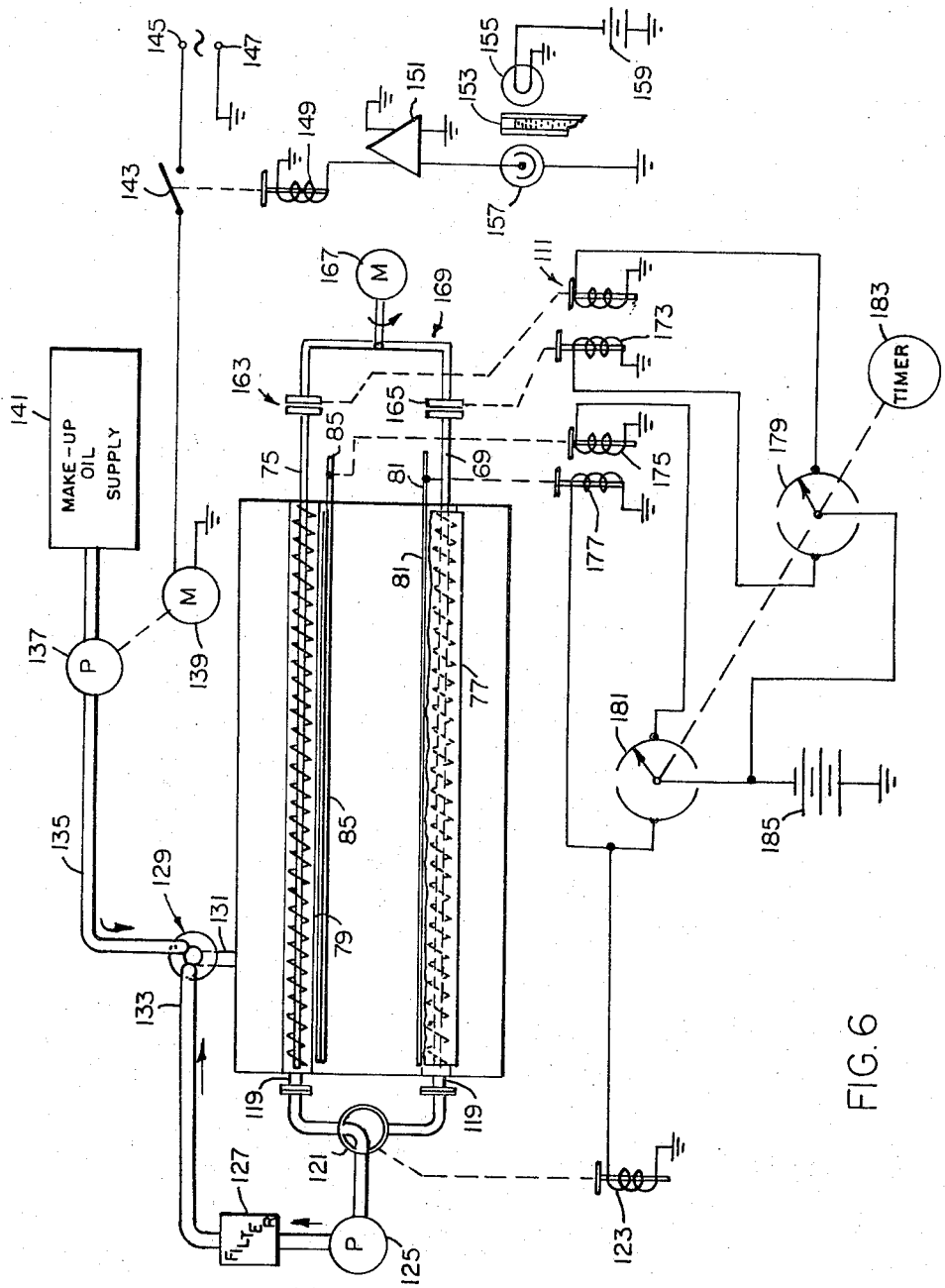
FIG. 6 is a schematic diagram of control apparatus for the fryer of FIGS. 1–5.

Referring to FIGS. 1 and 2, I have shown a fryer comprising a housing generally designated as 1 adapted to contain a bath of cooking oil 3. The housing is shaped to define a cooking region between downwardly sloping bottom walls 5 and 7 of the housing and plane side walls 9 and 11. An oil heating chamber is provided comprising a generally rectangular space defined by the side walls 9 and 11 and end walls 13 and 15. In this oil heating chamber are the coils 17 of a heat exchanger. For safety, each of the pipes 17 is continuous within the heating chamber, and the end fittings such as 19 and other connections in the heat exchanger are made externally of the cooking oil. In that manner, any possible contamination of the cooking oil by the heating medium is prevented. While various conventional construction materials could be employed, I prefer to make all of the apparatus in contact with the cooking oil or the food product of stainless steel.

The heat exchanger comprising the coils 17 is supplied with hot heat exchange fluids, at a temperature typically in the vicinity of 500° F., by means of a pipe 21. Heating fluid leaves the heat exchanger, through an outlet pipe 23, at a temperature of typically 440° F. The heat exchange fluid may be of any conventional variety, but is preferably non-flammable and stable at 500 to 600° F. The eutectic mixture of diphenyl and diphenyl oxide sold under the trademark "Dowtherm" is a suitable fluid for the purpose.

Heat exchange fluid is pumped by a conventional pump 26 through a heater 25 of any conventional construction. The heater 25 supplies heated fluid through a pipe 27 to a conventional three-way valve 29. The valve 29 is controlled, in a conventional manner not illustrated in detail, by a thermostat 31 located in the cooking oil bath to supply fluid to the inlet pipe 21 at a rate that will sustain the previously mentioned inlet and outlet temperatures. Heat exchange fluid not required for this purpose is by-passed to the heater 25 through a pipe 33.

As the apparatus for heating the heat exchange fluid is conventional, I have not shown it in detail. However, I prefer to include an expansion tank in the heat exchange fluid system, and to install a liquid level controller that will shut down the pump and heater if a drop in level indicates a leak in the heating system.

Food is supplied to the the cooker on a conveyer belt 35 mounted in the housing between an inlet port 98 and an outlet port 96. The conveyor belt 35 is driven at the input end of the fryer by a drive roll 37 journalled in the walls of the housing. The drive roll 37 is connected to a gear 39 in mesh with a gear 41. The gear 41 is also journalled in the housing. The gear 41 is driven by a conventional drive belt 43. The belt 43 is driven by a conventional electric motor 45 located outside of the cooking apparatus. The other end of the belt 35 passes over an idler roll 47 journalled in the walls of the housing 1.

The drive roll 37 and the idler roll 47 are located out of the cooking oil 3, and are so arranged that they can be lifted out to remove the belt 35 for cleaning. As indicated, the upper and lower runs of the belt 35 are supported on wear strips such as 49 removably mounted transversely in the side walls 9 and 11 of the housing, and made of any suitable durable material such as stainless steel or the like.

The belt 35 may be made of stainless steel. It is preferably of close mesh, to prevent to the extent possible the dropping of crumbs into the cooking oil bath 3.

Referring now to FIGS. 1, 2 and 3, the lower portion of the housing 1 is provided with a pair of settling wells. These wells are defined in their upper portions by the end walls 13 and 15 and by downwardly sloping side walls 51, 53, 55 and 57. The angle of the walls 51–57 is rather critical, and should be approximately 45 degrees. It will be apparent that the steeper the walls 51–57 are made, the more readily solid particles such as crumbs and the like will fall to the bottom. If the walls are at less than about 45 degrees to the horizontal, such particles would collect on the walls. On the other hand, the steeper the slope, the larger the volume of cooking oil required to fill the wells. Thus, optimum results are obtained when the walls are about 45 degrees to the horizontal.

At the bottom of each of the settling wells is a channel, such as the channels 59 and 61. The rest of the cooking apparatus is thoroughly insulated, as by insulating blocks 63 supported in brackets such as 65 mounted on the walls of the housing. However, the channels 59 and 61 are not insulated, so that the oil in them tends to be at a lower temperature than the body of the oil bath 3. In this manner, charring of crumbs in the channels is prevented.

Mounted in the channel 59 is a screw conveyor 67 having a drive shaft 69 extending outwardly through a stuffing box schematically indicated at 71 in FIG. 1. Drive apparatus for the shaft 69 will be described below. Mounted in the channel 61 is a similar screw conveyor 73 having a drive shaft 75.

The screw conveyors 67 and 73 are operated in conjunction with associated dampers. The dampers comprise panels 77 and 79 of sheet metal, such as stainless steel or the like. The damper 77 is connected to an actuating rod 81 by spaced brackets such as 83. Similarly, the damper 79 is connected to an actuating rod 85 by brackets such as 87. The rods 81 and 85 are passed through the end wall 15 of the housing through a suitable packing, not shown.

The dampers are adapted to be rotated between the position shown for the damper 77 in FIG. 2, in which crumbs can fall down into the channel 59, and the position shown for the damper 79, in which the top of the channel such as 61 is covered to form a substantially enclosed conduit in which the screw conveyor such as 73 can work without disturbing the body of the oil 3. It is not essential that the dampers tightly seal the conduits, as their purpose is served if they substantially baffle flow caused by operation of the conveyors. The control of the dampers and conveyors will be described in more detail below.

The fryer is provided with a cover 89 of stainless steel or the like, having depending side walls 91 and 93 engaging the side walls 9 and 11 respectively, and having end walls such as 95 engaging the end walls 97 of the cooking vessel. The side walls such as 93 are provided with ports as at 99 communicating with downcomers 101, as best shown in FIGS. 2 and 4, connected through ducts generally designated as 103 interconnected to a common duct 105. The duct 105 is connected to an exhaust fan of any conventional design, indicated at 107.

Each downcomer such as 101 is connected to one of the ducts 103 through a vertical duct such as 109 in which is mounted a damper valve 111 shown in more detail in FIG. 5. Each damper valve 111 is journalled in the duct 109, as by the pins 113, and is provided with a weight such as 115 secured to the damper to tend to cause clockwise rotation of the damper 111 as seen in FIG. 5. Rotation beyond the closed position is prevented by a catch 117 that may be formed in the wall of the duct 109.

As will be apparent to those skilled in the art, the weights 115 may be mounted adjustably if so desired, as by screws cooperating with slots in the dampers. Alternatively, the dampers 111 may be arranged to be fixed in adjusted positions as by a frictional clamp for the pins 113.

The weights 115 are adjusted, in conjunction with the capacity of the fan and the amount of water vapor produced in cooking the product, so that a slight pressure exists in the plenum formed between the cover 89 and the walls of the housing 1 over the surface of the cooking oil 3. The space in this plenum is thus filled with steam to the exclusion of air, and excess steam is exhausted by the fan 107 as it is produced in the cooking process. The apparatus is adjusted so that a small amount of steam escapes at the input port 98 and outlet port 96 of the cooking apparatus, excluding air from entering that might oxidize the oil 3.

A flanged fitting, such as that shown at 119 in FIG. 1, is provided at the outlet side of each of the conduits 59 and 61 in FIG. 2. The fittings 119 are connected to the end wall 13 of the cooker for attachment of the crumb removal channels to a suitable outlet conduit. As shown in FIG. 6, each such outlet fitting 119 is connected to one side of a three-way valve 121 controlled by a solenoid schematically indicated at 123.

Comparing FIGS. 1, 2 and 6, in one position of the valve 121, with the screw conveyor 67 operating and the damper 77 closed, cooking oil and crumbs will be delivered to a pump 124 through the channel 59. In the other position of the valve 121, with the screw conveyor 73 rotating and the damper 79 closed, oil and crumbs will be delivered from the channel 61 through the valve 121 to the pump 125. The pump may be of any conventional trap type suitable for handling fluid contaminated with solid matter.

From the pump 125, the oil and crumbs are passed to a filter 127 of any conventional construction, where the solid matter is removed. The clean oil is delivered through a conduit 133 to an oil return funnel 129 connected by a return conduit 131 to the cooking tank.

When required, makeup oil is supplied through a conduit 135 to the inlet funnel 129, by means of a conventional pump 137 connected to a suitable makeup oil supply tank 141. The pump is at times driven by a conventional electric alternating current motor 139, when the latter is connected to input terminals 145 and 147 of an alternating current source over a closed contact 143 of a relay 149.

The relay 149 is controlled by an amplifier 151, which has an input circuit including a photocell 157. The use of a photocell to control a relay through an amplifier is conventional, and suitable circuits are well known in the art. The apparatus is arranged so that when the photocell 157 is illuminated by a lamp 155, the amplifier 151 will supply energizing current for the relay 149 to close its contact 143 and operate the motor to drive the pump 137 and replenish the oil supply.

Referring now to FIG. 2, the photocell 147 and the lamp 155 are mounted on a common support 161 which can be slid up and down on a transparent oil level indicator tube 153 to adjust the reference level at which the photocell is illuminated. Preferably, the aperture of the housing in which the lamp 155 is mounted and the aperture exposing the photocell 157 are so arranged that the lamp 155 will not illuminate the photocell 157 until the oil level rises in the tube 153 and diffracts the beam of the lamp downward into position to illuminate the photocell. I have considered various float-type level indicators, but they have been found unsatisfactory in practice. The use of the diffracting properties of the oil column requires no apparatus to be included in the level control tube, and thus eliminates a source of expense, wear and improper operation.

Referring again to FIG. 6, the screw conveyor drive shafts 69 and 75, and the damper position control shafts 81 and 85, are under the control of timing apparatus that will next be described. By a conventional driving arrangement schematically indicated at 169, a motor 167 is arranged to continuously drive the input sides of two clutches 163 and 165. The clutches 163 and 165 are of the electromagnetic type, and are arranged to engage the respective screw conveyor shafts 75 and 69 when an associated solenoid 171 and 173, respectively, is energized. The shafts 81 and 85 need only be rotated through a predetermined angle to move from one position to another. For this purpose, the shaft 81 is controlled by the solenoid 177, which may be spring-biased to return the damper 77 to its open position when the solenoid is deenergized. When energized, the solenoid operates through a conventional linkage, not shown in detail, to rotate the arm 81 to close the damper 77. In a similar manner, the solenoid 175 when energized closes the damper 79 by rotating the shaft 85, and is spring-biased to return the damper to its open position when the solenoid is released. When the solenoid 177 is energized, the valve solenoid 123 is energized to set the valve 129 to the position in which the conduit 59 is connected through the valve 121 to the pump 125. When the solenoid 123 is deenergized, the other conduit 61 is connected to the pump 125.

The various valves, clutches and dampers just described are under the control of a timer motor 183 which is constantly driven to produce an operating cycle divided into two equal time intervals. In practice, it is found that about ten minutes for each half of the cycle is effective. The timer is connected to the wipers of two circuit controllers 179 and 181. These wipers are electrically connected to a battery or other suitable conventional source of potential 185. During approximately half of the operating cycle, the battery 185 is connected over the circuit controllers 179 and 181 to energize the solenoids 177 and 175. When these solenoids are energized, the clutch 163 will be engaged to drive the shaft 75, and the shaft 85 will be rotated to close the damper 79. At this time, with the solenoid 123 deenergized, the channel 61 will be connected to the pump 125 by the valve 121. The shaft 69 will be stopped, and the damper 77 will be opened. During the second half of the operating cycle, the circuit controllers 179 and 181 will cause the solenoids 173 and 177 to be energized, engaging the clutch 165 and rotating the shaft 81 to close the damper 77. The solenoid 123 will also be energized at this time, to connect the channel 59 to the pump 125.

Having described the apparatus of my invention, its mode of operation will be generally apparent to those skilled in the art. Specifically, however, assume that the oil heater 25 is in operation to supply heating oil to the heat exchanger comprising the coils 17 and that the oil bath 3 has been charged with a thousand pounds of oil. Initially, when the cooking oil 3 is still cold, the assembly comprising the photocell 157 and the lamp 155 is moved down on the level sensing tube 153, because the cold oil has less bulk than when heated. That step in the process prevents excess makeup oil from being supplied to the cooker. When the oil 3 has been brought up to temperature, the support 61 is moved up on the tube 153 to the proper level to cover the product when it is supplied on the belt 35. The motor 45 is started, and with the thousand pound oil change assumed, three thousand pounds per hour of any desired product, such as breaded fishsticks or the like, is supplied to the belt 35. The fan 107 is operated, and the cooking process begins. At the product rate assumed, approximately 300 pounds of oil per hour will be taken out on the fried product, and approximately 300 pounds of water vapor per hour will be driven off the product and form steam in the vapor space above the oil bath. That steam will be exhausted by the fan 107 under the control of the dampers 111 at a rate sufficient to form a protective vapor space over the oil to prevent it from oxidation. During the cooking operation, the circuit controllers 179 and 181 will be sequentially operated to take off crumbs and other debris settling into the channels 61 and 59. One step is the closing of the damper 79 and the operation of the screw conveyor 73, while the damper 77 is open and the screw conveyor is stopped. Next, as described above, the damper 77 is closed and the screw conveyor 67 is opened, while the damper 79 is opened and the screw conveyor is stopped. Cleaned cooking oil will continually be returned by the pump 125 through the filter 127, and makeup oil will be supplied as needed from the tank 141.

While I have described my invention with respect to the details of a preferred embodiment thereof, many changes and variations will be apparent to those skilled in the art upon reading my description, and such can

Having thus described my invention, what I claim is:

1. A continuous fryer, comprising a container for cooking oil adapted to be filled with cooking oil to a predetermined level, conveying means mounted in said container for conveying food to be fried from an inlet end of the containr above said level along a path below said level to an exit end above said level, means for heating oil in the container to a predetermined cooking temperature, a crumb collecting channel extending along the bottom of the container, a damper adjustably mounted in the container for movement between an open position in which the channel is exposed to solid particles falling down through oil in the container during the cooking process and a closed position in which the upper portion of the channel is substantially closed by the damper to form a conduit through which oil bearing collected particles can be exhausted without disturbing the bulk of the oil in the container, and means operative when the damper is in its closed position for pumping oil containing collected particles out of said conduit.

2. A continuous fryer, comprising a container for cooking oil, conveying means mounted in said container for continuously moving food to be fried into and out of oil in the container, means for heating oil in the container to a predetermined cooking temperature, an open channel formed at the base of the container to collect solid particles falling down through the oil during the cooking process, means for substantially closing said channel to form a conduit, and means operative when said channel is closed to exhaust oil and collected particles from said conduit.

3. The apparatus of claim 2, in which insulating means are mounted on all the surfaces of said container except the surface of said channel, whereby oil in the channel assumes a lower temperature during cooking than the bulk temperature of the oil in the container.

4. The apparatus of claim 2, further comprising a filter, means for supplying oil exhausted from said channel to said filter to remove collected particles from the oil, means for returning filtered oil from the filter to the container, a source of makeup oil, and means responsive to the level of oil in the container for supplying makeup oil from said source to said container to maintain the oil in the container at a predetermined level.

5. The apparatus of claim 2, further comprising a cover on said container, an exhaust fan, ducts connecting the plenum, formed in the container between the cover and the surface of an oil charge in said container, to said fan, and dampers in said ducts to limit the flow of gases from said plenum through said fan to a flow rate just sufficient to exhaust moisture evaporated from the frying food during frying and maintain a slight vapor pressure above atmospheric in the plenum to exclude air from the surface of the cooking oil.

6. A continuous fryer, comprising a container for cooking oil, means for heating a charge of cooking oil in said container to a predetermined cooking temperature, means for continuously conveying articles into and out of the container to be fried by hot oil in the container, first and second particle collecting channels formed at the base of the container, first and second dampers mounted above said first and said second channels, respectively, each damper being movable between a first position in which the channel below it is open to receive particles falling down through the oil in the container during the cooking process and a second position in which the channel below it is substantially closed by said first damper, timing means cyclically operable to a first state for predetermined time and to a second state for a predetermined time, means actuated by said timing means in its first state for moving said first damper to its first position and said second damper to its second position, means operated by said timing means in its second state for moving said first damper to its second position and said second damper to its first position, means actuated by said timing means in its first state for exhausting oil and collected particles from said second channel, and means actuated by said timing means in its second state for exhausting oil and collected particles from said first channel.

7. The apparatus of claim 6, further comprising a filter, a pump, and means connecting said pump and filter in series to form an oil cleaning return line for said container, and in which said means for exhausting oil from said channels comprises valve means interconnecting said channels and said return line and having a first position in which said first channel is connected to said return line and a second position in which said second channel is connected to said return line, means actuated by said timing means in its second state for actuating said valve means to its first state, and means actuated by said timing means in first state for actuating said valve means to its second state.

8. The apparatus of claim 6, further comprising a cover on said container, an exhaust fan, ducts connecting the plenum, formed in the container between the cover and the surface of an oil charge in said container, to said fan, and dampers in said ducts to limit the flow of gases from said plenum through said fan to a flow rate just sufficient to exhaust moisture evaporated from the frying food during frying and maintain a slight vapor pressure above atmospheric in the plenum to exclude air from the surface of the cooking oil.

References Cited

UNITED STATES PATENTS

| | | | |
|---|---|---|---|
| 2,349,566 | 5/1944 | Thompson | 99—408 X |
| 2,652,767 | 9/1953 | Childs | 99—408 |
| 3,309,981 | 3/1967 | Benson | 99—407 X |

ROBERT W. JENKINS, *Primary Examiner.*